3,111,859
TWO PART WELD-ON REPLACEMENT RIM FOR SPROCKET
Joseph Malone, P.O. Box 1038, San Jose, Calif.
Filed June 15, 1961, Ser. No. 117,439
8 Claims. (Cl. 74—243)

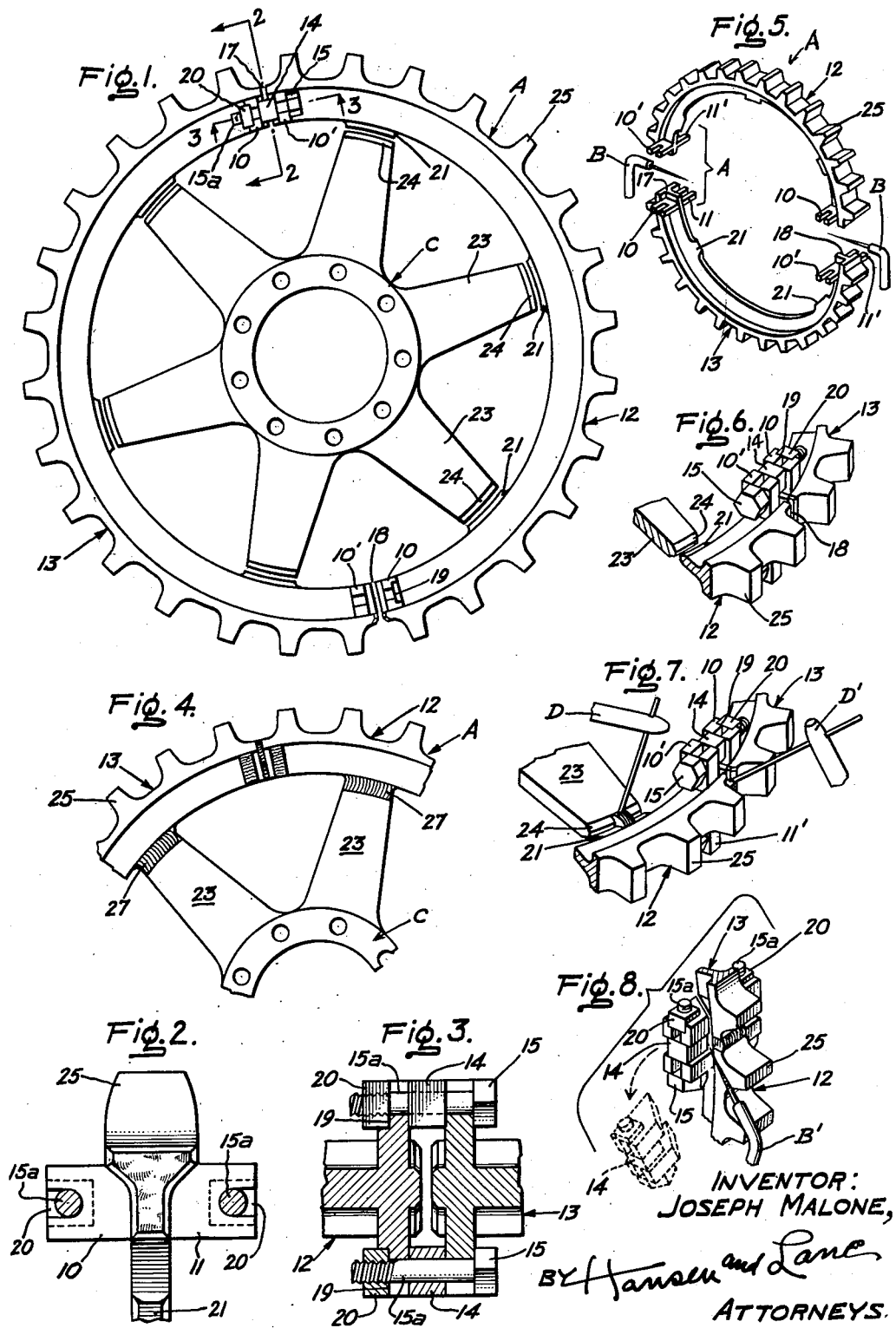

The present invention relates to sprockets, and pertains more particularly to a weld-on, toothed replacement rim for a worn sprocket, particularly a sprocket of the type used for the tracks of track-laying vehicles such as tractors.

The large track sprockets provided one at each end of each track of a track-laying type vehicle, one of which sprockets is usually driven, and the other of which is usually an idler, are subjected to extreme conditions of wear, since vehicles of this type frequently operate in sand, mud and dust, and track sprockets are directly subjected to the abrasive action of these materials.

In the past toothed replacement rims have been proposed for such sprockets, but in order to replace such rims it has been necessary to remove at least the large, heavy outer frame member of the track assembly, which frame member is mounted exteriorly of the track sprockets. Such frame member removal is ordinarily a shop operation, and cannot be performed readily in the field.

The present invention provides an improved and simplified weld-on, replacement rim for a sprocket.

A further object of the invention is to provide a weld-on sprocket rim replacement for a track sprocket of a track-laying vehicle, and which is capable of being easily and quickly welded onto a sprocket from which the old rim has been removed without the necessity of removing a side frame member which may be mounted laterally outwardly of such sprocket.

A further object of the invention is to provide a replaceable, weld-on type sprocket rim in two complementary half portions which are provided with positioning and aligning means for insuring accurate, circular positioning of the two half portions for welding the latter onto a central sprocket portion from which the original rim has been removed.

These, and other objects and advantages of the invention, will be apparent from the following description and the accompanying drawings, wherein:

FIG. 1 is a side elevational view of a two-part replacement sprocket rim embodying the invention positioned ready for welding co-axially onto a sprocket central portion from which the old rim has been removed.

FIG. 2 is an enlarged, fragmentarily, sectional view taken along line 2—2 of FIG. 1.

FIG. 3 is a similarly enlarged, fragmentary, sectional view taken along line 3—3 of FIG. 1.

FIG. 4 is a fragmentary, side, elevational view of the upper central portion of the assembly shown in FIG. 1 after the welding operations have been completed, and the positioning lugs, bolts and spacers have been cut away.

FIG. 5 is a perspective view in reduced scale showing how one form of the invention may be severed into two half portions by a cutting torch prior to mounting a replacement rim on a sprocket central portion.

FIG. 6 is a fragmentary, perspective view to the same scale as FIG. 1, and showing the connecting bolt, spacer and lug arrangement for positioning the two halves of the replacement sprocket rim in aligned, circularly complementary relation, ready for welding onto the old sprocket central portion from which the original toothed rim has been cut away.

FIG. 7 is a fragmentary, perspective view of substantially the same portions as those shown in FIG. 6, and showing steps in the welding procedure.

FIG. 8 is a fragmentary, perspective view of the joint portions shown in FIGS. 6 and 7 with the two halves of the replacement rim welded together and to the spokes of the old sprocket central portion, and showing a cutting torch in the act of removing the positioning lug, bolt and spacer assemblies, the broken lines showing one such assembly removed and falling away.

Briefly, the present invention comprises a two-part, replacement sprocket A (FIGS. 1 and 5) preferably manufactured in integral ring form, and when so manufactured, designed to be cut in two by a cutting torch B as shown in FIG. 5 prior to being welded as a replacement rim onto a sprocket central portion C from which the old rim (not shown) has been cut away. Two pairs of oppositely extending positioning lugs 10 and 10' and 11 and 11' are provided, one pair on each end of each of two half portions 12 and 13 of the replacement rim A. The positioning lugs 10 and 11 and 10' and 11' on each side of the juncture of the two rim portions 12 and 13 are spaced apart to receive spacers 14 in closely interfitted relation therebetween when the two rim portions 12 and 13 are positioned in properly aligned, circularly complementary relation. The opposed lugs 10 and 11 and 10' and 11' are drawn together by bolts 15 to grip their respective spacers 14 firmly therebetween as shown in FIGS. 1, 2, 3, 6 and 7.

The replacement sprocket rim A is assembled co-axially over a sprocket central portion C (FIG. 1) from which the old sprocket rim (not shown) has been cut away, and is then welded in such co-axial position thereon as shown in FIG. 4. After the two half portions 12 and 13 of the replacement rim A are firmly welded together and onto the sprocket central portion C, the positioning lugs 10 and 11 and 10' and 11' may be cut away as shown in FIG. 8, carrying the bolts 15 and spacers 14 with them.

Referring to the drawings in greater detail, a replacement sprocket rim A embodying the present invention may be manufactured either in two separate half portions 12 and 13, or it may be cast as an integral ring as it would have been in the structure shown in FIG. 5 before the two halves thereof had been separated as at 17 and 18 (FIG. 5) by a cutting torch B.

It is preferred to manufacture the two complementary rim portions 12 and 13 as a single, integral ring structure, since this permits fitting the spacers 14 accurately between their respective lugs 10 and 11 and 10' and 11' before cutting the ring in two as shown in FIG. 5. This assures that when the two rim portions 12 and 13 are cut in two and reassembled with the same spacer arrangement, that a true, accurate, circular alignment of the two resultant half rim portions 12 and 13 will result. Another advantage of manufacturing the two sprocket rim half portions 12 and 13 as an integral ring resides in the fact that in welding a replacement rim A onto a sprocket which is fully exposed, and thus able to receive the ring as a unit, it is not necessary to sever the ring into its two separate halves, which further simplifies sprocket rim replacement in such cases.

The two sets of pairs of positioning lugs 10 and 11 and 10' and 11' on the two half rim portions 12 and 13 are spaced back from the respective separations 17 and 18 between the rim portions 12 and 13 sufficiently to receive a spacer 14 between each opposed pair of the lugs 10 and 11 and 10' and 11' when the rim portions are assembled in circularly aligned, complementary relation as shown in FIG. 1. The spacers 14 may be unthreaded nuts of a size to fit snugly into the spaces between their respective lugs 10 and 11 and 10' and 11', and also to fit freely onto the shanks 15a of the bolts 15 which secure the two rim portions 12 and 13 together for welding.

A recess 19 is provided in each of the lugs 10 and 10' of a size to seat therein the nut 20 of its respective bolt 15 used to secure the two rim portions 12 and 13 together. These recesses 19 hold the nuts 20 against turning while screwing the bolts 15 into and out of the nuts. Small, radially inwardly extending spoke projections 21, the inner ends of which are preferably beveled as at 22 in FIG. 6, may be provided on the inner edges of the rim portions 12 and 13 in position to align, respectively, with the spokes 23 of the sprocket central portion C after the old sprocket rim thereof has been cut away and discarded.

However, these vestigial spoke projections 21 are not material to the invention, and when they are not employed, the entire inner edges of the two rim portions 12 and 13 are preferably uniformly beveled to provide V-shaped grooves between the beveled, radially outward end of each spoke 23 of the central sprocket portion C and the inner edge of the rim portion adjacent thereto. In accordance with good welding practice it is preferred that all portions of the rim and sprocket central portion which are to be welded together are beveled in this same manner to provide such V-shaped grooves to receive the welds therein.

Operation

It is assumed for the purpose of the present description that a track sprocket, mounted in the track frame of a conventional crawler or track-laying tractor, is to have the worm out rim thereof replaced in accordance with the present invention without removing such sprocket from the track frame in which it is installed, and that such track frame has a usual longitudinal frame member mounted thereon laterally outwardly of the sprocket which prevents the removal or replacement of an integral, ring-type sprocket rim on such sprocket.

The old rim, not shown, of such sprocket is first cut away from the spokes 23 thereof, as by means of a conventional cutting torch B (FIG. 5), and is then cut in two, removed, and discarded. The spokes 23 are cut to uniform length so that their outer ends will be spaced radially slightly inwardly, and within welding distance of, the spoke portions 21 of a replacement sprocket rim A to which said spokes are to be welded. The outer ends of the spokes 23 preferably are beveled as at 24 (FIGS. 6 and 7).

With the bolts 15 and their spacers 14 removed from the new replacement rim A, and assuming that the latter has been cast or forged as a single, integral ring, and with opposed pairs of the lugs 10 and 11 and 10' and 11' spaced apart to receive the spacers in closely interfitted relation therebetween, the new rim A is then cut in two at 17 and 18 as shown in FIG. 5, substantially mid-way between the two sets of spacing lugs 10 and 10' and 11 and 11' on diametrically opposite sides of the new rim A. It will be noted that the zones of severance 17 and 18 of the new sprocket rim A are located substantially mid-way between adjacent teeth 25 of the rim. This is important, since obviously it is preferable not to have to cut and re-weld a tooth when severing and welding together the two half portions 12 and 13 of the new rim.

The two halves 12 and 13 of the new, or replacement sprocket rim A are then placed around the shaft (not shown) upon which the sprocket central portion C is mounted, and the four spacers 14, with their four bolts 15 inserted therein, are fitted between their respective sets of lugs 10 and 10' and 11 and 11' as shown in FIGS. 6 and 7, with their nuts 20 fitted into their respective lug recesses 19. The bolts are then drawn down tight to clamp the spacers between their respective lugs, and thus position the two halves 12 and 13 of the new sprocket rim A in the same complementary, circular relation that they were in before being cut apart.

The replacement rim A thus assembled is then carefully positioned, by means of suitable jigs, fixtures or other holding means (not shown), but which can be readily provided or devised in a well known manner by a welder of ordinary ability, so that the new rim is positioned co-axially of the old sprocket central portion C, and is centered over the ends of the spokes 23 thereof. The new rim A is then tack welded, by suitable welding means, such as an electric arm welding mechanism D, to the ends of the spokes 23 (FIG. 7) and also the two rim half portions 12 and 13 are tack welded together by the same or other suitable welding means D' as also shown in FIGS. 7.

The welds are then completed at the end of each spoke 23 as at 27 FIG. 4 and along the radially outer and inner sides of the junctures 17 and 18 of the two rim half portions 12 and 13. The lugs 10 and 11 and 10' and 11' with their respective bolts 15 and spacers 14 are then cut away as by means of a cutting torch B' as shown in FIG. 8. The side welds 28 at the sides of the rim junctures 17 and 18 are completed as shown in FIG. 4. This completes the rim replacement and the rebuilt sprocket thus formed is then ready for use.

The invention provides a simple, inexpensive, and easily mounted replacement rim for a sprocket, and one which permits the replacing of the rim on an old sprocket without removing restricting external structure which prevents the mounting of the new rim in integral, annular form on a central sprocket portion from which the old, worn rim has been cut away. Replacement rims embodying the invention may be manufactured either in two complementary half portions, or, as presently preferred, in the form of a single, integral ring adapted to be cut in two and then reassembled for mounting where required.

While I have illustrated and described a preferred embodiment of the present invention, it will be understood, however, that various changes and modifications may be made in the details thereof without departing from the scope of the invention as set forth in the appended claims.

Having thus described the invention, what I claim as new and desire to protect by Letters Patent is defined in the following claims:

1. A weld-on replacement rim for a spoke type track sprocket of a crawler type tractor which is restricted against access by a unitary replacement rim, and comprising two toothed, complementary, semi-circular, sprocket rim portions of a size to be assembled in complementary relation around, and in centered relation over, the spoke ends of a sprocket central portion from which the former toothed rim thereof has been cut away, a pair of laterally oppositely extending lugs on each end of each of said rim portions, each pair of said lugs on one of said rim portions being opposed to, and spaced from, a corresponding pair of lugs on the other rim portion, a spacer fitted closely between each opposed pair of said lugs, and means clamping each of the spacers closely between its respective pair of said lugs to thereby retain the lugs in spaced apart relation to facilitate welding the ends of the rim portions together, and at the same time to position the rim portions in complementary, circular relation for positioning co-axially around such sprocket central portion, thereby to form a two part sprocket rim adapted to be welded together into a sprocket rim unit, and welded also, co-axially, onto the spoke ends of such sprocket central portion to form therewith an integrally welded sprocket, after which the lugs and their spacers are adapted to be cut away.

2. A weld-on replacement rim for a sprocket comprising two toothed, substantially similar, semi-circular, sprocket rim portions of a size to be assembled in complementary relation around the spoke ends of a sprocket central portion from which the former toothed rim thereof has been removed, a rim positioning lug spaced circumferentially inwardly from each end of each rim portion, a spacing member for fitting closely between opposed pairs of the positioning lugs of both rim portions with the rim portions in complementary, circular relation, and clamping means co-operating with each opposed pair of positioning lugs for clamping the latter onto their respective spacing members, thereby to fixedly position the two rim portions in such complementary, circular relation, with the ends of the rim portions exposed for welding the rim portions into a unitary sprocket rim, and for welding such unitary rim onto the spoke ends of such sprocket central portion to form therewith an integrally welded, unitary sprocket.

3. An arrangement according to claim 2 wherein the positioning lugs project laterally from their respective rim portions and the clamping means are spaced outwardly from the rim portions to facilitate cutting the lugs and clamping means cleanly away from the rim portions upon completion of the welding operations.

4. A weld-on replacement rim for a sprocket comprising two toothed, substantially similar, semi-circular, sprocket rim portions of a size to be assembled in complementary, circular, endwise adjacent relation closely around the spoke ends of a sprocket central portion from which the former toothed rim thereof has been severed, an endwise facing lug spaced circumferentially inwardly from each end of each rim portion, a spacing block for positioning between opposed pairs of said lugs on the two rim portions with the rim portions positioned in such complementary, circular relation, the spacing members being of a thickness to hold adjacent ends of the sprocket rim portions slightly apart for welding, and clamping means co-operating with each opposed pair of said lugs with a spacing block interposed therebetween for retaining the two rim portions in such complementary, circular relation for welding the rim portions into a unitary sprocket rim, and for welding such unitary rim onto the spoke ends of such sprocket central portion to form therewith an integrally welded, unitary sprocket.

5. A weld-on replacement rim for a sprocket which is restricted against access by a unitary replacement rim, and comprising two toothed, complementary, semi-circular rim portions of a size to be assembled in complementary, weld-on relation around a sprocket central portion from which the former toothed rim thereof has been removed, two clamping abutments extending in opposite directions from opposite sides of each rim portion adjacent each end thereof, means for clamping each of the abutments of one rim portion in accurately positioned relation to an abutment of the other rim portion to thereby position the rim portions in complementary, circular relation for positioning co-axially around such sprocket central portion, thereby to form a two part sprocket rim adapted to be welded into a sprocket rim unit, and welded also, co-axially, onto such sprocket central portion to form therewith an integrally welded sprocket, with the abutments and their clamping means projecting laterally therefrom for easy severance.

6. A weld-on sprocket replacement rim comprising a toothed rim of an internal diameter to fit co-axially around, and in centered relation over, a sprocket central portion from which the former toothed rim thereof has been removed, two opposed pairs of axially oppositely extending lugs on each side of an inter-tooth, diametrical plane of the rim, each opposed pair of said lugs being spaced apart to provide a cutting zone therebetween, and to receive a spacer in closely interfitted relation therebetween, a clamp bolt for operatively engaging each opposed pair of said lugs, and a spacer of a size to fit closely between each opposed pair of said lugs, whereby, when said sprocket rim is cut in two by severing it through such cutting zones and the two portions thus formed are re-assembled in complementary, circular relation co-axially around such sprocket central portion, and with each of said spacers interposed between its opposed pair of the lugs, and the clamp bolts are in operative engagement with their respective pairs of the lugs and are drawn down to clamp the spacers firmly between their respective lugs, the two part sprocket rim thus formed is positioned for re-welding into a rim unit and for welding also co-axially onto such sprocket central portion, to thereby form with the latter an integrally welded sprocket unit with the lugs, spacers and clamp bolts projecting laterally therefrom for easy severance.

7. A weld-on replacement rim for a sprocket comprising two toothed, semi-circular rim portions of a size to be assembled in complementary, circular, endwise adjacent relation around the spoke ends of a sprocket central portion from which the former toothed rim thereof has been severed, positioning means on each end of each rim portion, spacing means interposed between the positioning means on each end of each rim portion and the positioning means on the adjacent end of the other rim portion with the two rim portions assembled in complementary, circular relation, to hold the ends of adjacent rim portions slightly spaced apart for welding and means clamping each of the spacing means closely between its respective positioning means to thereby retain the rim portions in such complementary, circular, endwise adjacent relation for welding co-axially to the spoke ends of such sprocket central portion.

8. A weld-on replacement rim for a sprocket comprising two toothed, substantially similar, semi-circular, sprocket rim portions of a size to be assembled in complementary, circular relation closely around the spoke ends of a sprocket central portion from which the former toothed rim thereof has been severed, positioning means adjacent each end of each rim portion for co-operation with positioning means opposite thereto on the other rim portion for positioning the two rim portions in such complementary, circular relation, and clamping means co-operating with opposed pairs of the positioning means for clamping together the two rim portions in such complementary, circular relation for welding the rim portions into a unitary sprocket rim, and for welding such unitary rim onto the spoke ends of such sprocket central portion to form therewith an integrally welded, unitary sprocket, the positioning means extending transversely from their respective rim portions to facilitate severance of the positioning means upon completion of welding operations.

References Cited in the file of this patent
UNITED STATES PATENTS

| 827,757 | Waterfield | July 24, 1906 |
| 2,258,225 | Shores | Oct. 7, 1941 |